United States Patent [19]

Kitamura et al.

[11] 4,238,146
[45] Dec. 9, 1980

[54] SOUND ALARM DEVICE IN A CAMERA

[75] Inventors: Yasunori Kitamura, Tokyo; Shigeo Akasaka, Kodaira; Sakuji Watanabe, Warabi; Mikio Takemae, Yokohama; Yoshiaki Ohtsubo; Ryuzo Motoori, both of Kawasaki, all of Japan

[73] Assignee: Nippon Kogaku K.K., Tokyo, Japan

[21] Appl. No.: 69,166

[22] Filed: Aug. 23, 1979

[30] Foreign Application Priority Data

Aug. 25, 1978 [JP] Japan .................... 53-115718[U]

[51] Int. Cl.³ .......................................... G03B 17/20
[52] U.S. Cl. ................................. 354/53; 354/60 E; 354/289
[58] Field of Search ................... 354/53, 60 E, 60 L, 354/289

[56] References Cited

U.S. PATENT DOCUMENTS 3,592,113  7/1971  Wasielewski ................ 354/53 X
4,037,235  7/1977  Ueda ............................ 354/53 X Primary Examiner—Michael L. Gellner
Attorney, Agent, or Firm—Fitzpatrick, Cella, Harper & Scinto

[57] ABSTRACT

An alarm device in a camera comprises a shutter speed manual/auto change-over dial having a first Auto position and a second Auto position, and alarm sound generating circuit operatively associated with the change-over dial so as to become operative in the first Auto position and to become non-operative in the second Auto position, and means for visually displaying the sound alarm non-operation condition which is operatively associated with the change-over dial so as to become non-operative in the first Auto position and to become operative in the second Auto position.

5 Claims, 2 Drawing Figures

SOUND ALARM DEVICE IN A CAMERA

BACKGROUND OF THE INVENTION

1. Field of the Invention

This invention relates to an alarm device in a camera.

2. Description of the Prior Art

In the automatic exposure photography of a camera, it is necessary to give an alarm to the photographer when the brightness of an object is too high or too low for the set film sensitivity and aperture value and a proper shutter speed of the camera is not obtained or when the shutter speed is a slow speed which tends to create a hand vibration. Such alarm is usually effected by a visual display, but an alarm by sound may be said to be an appropriate method when it is taken into consideration that the photographer is watching an object.

On the other hand, where such a sound alarm device is added to the camera, it is required that the operation of the sound alarm device can be switched on and off in accordance with the intention of the photographer. This is because there are cases where it is not desirable to give a sound. However, adding a switch for preventing the operation of the sound alarm device in addition to the conventional dial and switch leads to increased manufacturing cost and adds to cumbersomeness in operation. Also, if the added switch is one which only has the mere ON-OFF function, there would be an undesirable possibility that the sound-arrested condition is forgotten and photography is effected beyond the control range of automatic exposure or in spite of hand-vibrated condition.

SUMMARY OF THE INVENTION

It is an object of the present invention to provide an alarm device in a camera having means for letting the photographer recognize even in OFF condition that the operation of the sound alarm device is in non-operative condition, without adding a new switch for switching on and off the sound alarm device.

According to the present invention, the above-mentioned task is achieved by an alarm device in a camera which comprises a shutter speed Manual/Auto change-over dial having a first Auto position and a second Auto position, an alarm sound generating circuit operatively associated with the change-over dial so as to become operative in the first Auto position and then to become operative in the second Auto position, and means for visually displaying the sound alarm non-operation condition which is operatively associated with the change-over dial so as to become non-operative in the first Auto position and to become operative in the second Auto position.

The invention will become fully apparent from the following detailed description thereof taken in conjunction with the accompanying drawings.

DESCRIPTION OF THE PREFERRED EMBODIMENTS

Figure 1:
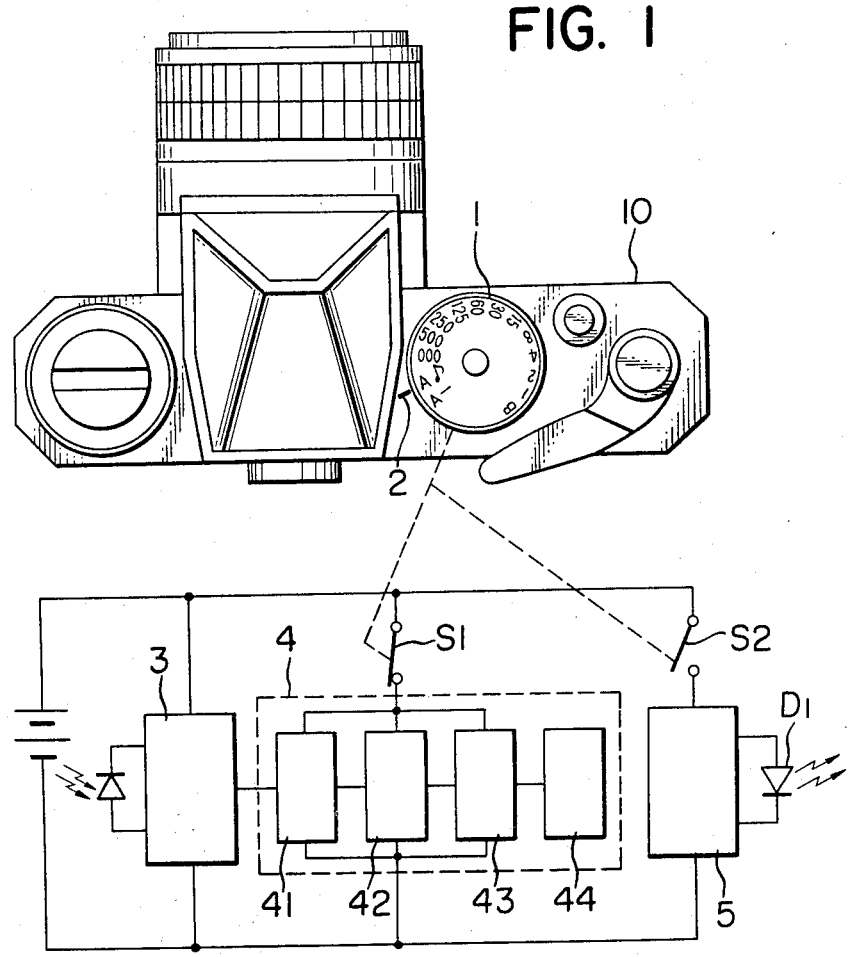
FIG. 1 shows the construction of a first embodiment of the present invention.

FIG. 1 shows a first embodiment of the present invention. A shutter speed change-over dial 1 is rotatably mounted on a camera body 10. The change-over dial 1 is changeable over between a manual area and an auto area, and in the manual area, by registering a numeral on the dial such as 1, 2, 4, 8, ..., 250, 500 or 1000 to an index mark 2 formed on the camera body, it is possible to obtain a shutter speed corresponding to these numerals, such as 1, ½, ¼, ⅛, ... 1/250, 1/500 or 1/1000 sec. In the auto area, by registering the mark A♭ or A− on the dial to the index mark 2, it is possible to obtain a shutter speed automatically determined by exposure conditions such as the brightness of the object, aperture value, film sensitivity, etc., by an exposure control circuit 3 contained within the camera 10. The rotation of the change-over dial 1 is operatively associated with the switch of the electrical circuit system of the sound alarm device. An alarm sound generating circuit 4 provided in the camera body is connected with the exposure control circuit 3 and includes a detecting circuit 41 detecting an output voltage of the exposure control circuit 3 and generating a detecting signal when the control by the exposure control circuit 3 is impossible or when the shutter speed is a slow speed which tends to create a hand vibration, an oscillator circuit 42 connected with the detecting circuit 41 and a circuit 43 for driving a sound generator 44. A switch S1 is provided to switch on and off the operation of the alarm sound generating circuit 4. A sound alarm OFF display circuit 5 for displaying the non-operative condition of the sound alarm energizes a display element D1 such as a light-emitting diode to turn on the same when a switch S2 is closed. The display element D1 is disposed in opposed relationship with the shutter speed of the hand vibration limit of a plate for displaying the shutter time which lies within the finder of the camera.

The switches S1 and S2 are operatively associated as follows with the two auto positions A♭ and A− of the aforementioned change-over dial 1.

When the Auto symbol A♭ of the change-over dial 1 is registered to the index mark 2, the switch S1 is closed in response thereto, the sound alarm generating circuit 4 becomes operative and at the same time, the switch S2 is opened and a circuit 5 for displaying the sound alarm OFF condition becomes non-operative to give a sound alarm representative of an inappropriate photographing condition. When the Auto symbol A− is registered to the index mark 2, the switch S1 is opened in response thereto, the sound alarm generating circuit 4 becomes non-operative and at the same time, the switch S2 is closed and the circuit 5 for displaying the sound alarm OFF condition becomes operative to turn on the display element D1 such as a light-emitting diode and display the sound alarm non-operative condition within the finder. By this, it is possible to effect both the sound alarm non-operation and the hand vibration limit shutter speed display. Where the construction is made such that the turn-on of the display element D1 indicates the normal condition, the opening-closing of the switch S2 may be reversed so that the turn-off of the display element D1 indicates the sound alarm OFF condition. When the other symbols of the Manual/Auto change-over dial 1 than the symbols A♭ and A− (for example, 250, 125, ...) are registered to the index mark 2, both switches S1 and S2 are opened and neither of the sound alarm and the sound alarm OFF display is effected.

Figure 2:
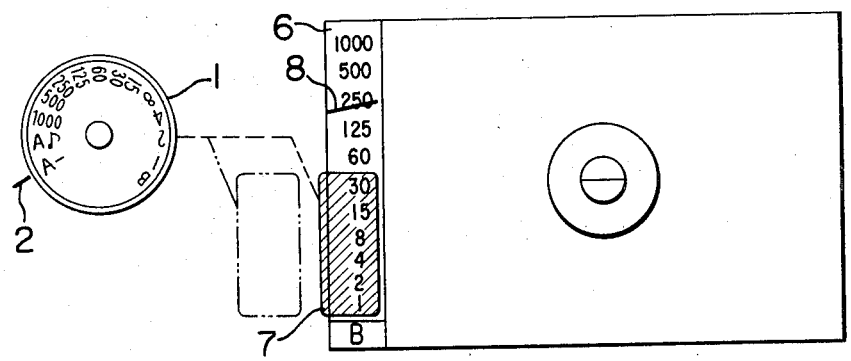
FIG. 2 shows the sound alarm non-operative condition display device according to a second embodiment of the present invention.

FIG. 2 shows a second embodiment in which the switch S2 and the sound alarm display of the display circuit 5 are replaced by mechanical ones. When the symbol A— of the Manual/Auto change-over dial 1 is registered to the index mark 2, a colored transparent film 7 overlaps a shutter time display plate 6 within the finder in response thereto to thereby display the sound alarm OFF condition. The colored transparennt film 7 is limited in size so that it can overlap only the numerical values (e.g. 1–30) corresponding to the hand vibration time (e.g. 1 1/30 sec.), as shown, and when a needle 8 for displaying the shutter time during automatic exposure photography has come to the portion of the colored transparent film 7, it represents an alarm for hand vibration. That is, the film 7 displays the sound alarm OFF condition within the finder, and displays a visual alarm when an alarm is required for the shutter time. When the other symbols than the symbol A— of the Manual/Auto change-over dial 1 are registered to the index mark 2, the colored transparent film 7 does not overlap the shutter time display plate 6 but is accommodated in any position outside the finder's view field, as indicated by dots-and-dash line.

We claim:

1. An alarm device in a camera having means for generating an alarm sound for the operative condition of an exposure control circuit for determining the shutter speed in accordance with exposure information and/or the determined shutter speed, the improvement comprising:

a shutter speed change-over dial changeable over to a first auto position and a second auto position, said dial, when in any of said first and second auto positions, being effective to energize said exposure control circuit into its operative condition;

switch means responsive to the change-over operation of said change-over dial so as to energize said alarm sound generating means when said change-over dial is in said first auto position and to deenergize said alarm sound generating means when said change-over dial is in said second auto position; and display means capable of effecting a visual display at a recognizable position through the eyepiece portion of the finder of said camera, said display means being energized in response to the change-over operation and adapted, when energized, to effect said display.

2. The device according to claim 1, further comprising means for selectively energizing one of said alarm sound generating means and said display means.

3. The device according to claim 2, wherein said display means includes a light-emitting display element, and said energizing means includes switch means capable of selectively applying a source voltage.

4. The device according to claim 2, wherein said display means includes a colored transparent member capable of entering into the view field of said finder.

5. The device according to claim 4, wherein said camera has a member for displaying the shutter time within the view field of said finder, and said colored transparent member is provided so as to overlap at least a part of said display member when it enters into the view field of said finder.

* * * * *